US011982929B2

United States Patent
Miura et al.

(10) Patent No.: US 11,982,929 B2
(45) Date of Patent: May 14, 2024

(54) ELECTRONIC UNIT INCLUDING A FAN, PROJECTOR INCLUDING A FAN, AND COOLING CONTROL METHOD FOR THE ELECTRONIC UNIT INCLUDING THE FAN

(71) Applicant: CASIO COMPUTER CO., LTD., Tokyo (JP)

(72) Inventors: Kohei Miura, Akishima (JP); Tomoyuki Ueda, Hamura (JP); Kiyohiko Inoue, Sagamihara (JP)

(73) Assignee: CASIO COMPUTER CO., LTD., Tokyo (JP)

(*) Notice: Subject to any disclaimer, the term of this patent is extended or adjusted under 35 U.S.C. 154(b) by 0 days.

(21) Appl. No.: 16/823,711

(22) Filed: Mar. 19, 2020

(65) Prior Publication Data

US 2020/0310232 A1 Oct. 1, 2020

(30) Foreign Application Priority Data

Mar. 25, 2019 (JP) .................................. 2019-056487
May 30, 2019 (JP) .................................. 2019-100941

(51) Int. Cl.
*G03B 21/16* (2006.01)
*F04D 15/00* (2006.01)
*H04N 9/31* (2006.01)

(52) U.S. Cl.
CPC .......... *G03B 21/16* (2013.01); *F04D 15/0066* (2013.01); *F04D 15/0072* (2013.01); *H04N 9/3144* (2013.01)

(58) Field of Classification Search
CPC .............................. G03B 21/16; H04M 9/3144
See application file for complete search history.

(56) References Cited

U.S. PATENT DOCUMENTS 6,419,364 B2 * 7/2002 Takizawa ............... G03B 21/16
                                                              348/748
6,702,444 B2 * 3/2004 Takizawa ............... G03B 21/16
                                                              348/748

(Continued)

FOREIGN PATENT DOCUMENTS

CN    207216248 U    4/2018
JP    H08-22345 A    1/1996

(Continued)

OTHER PUBLICATIONS

CNIPA; Application No. 202010213114.X; Notice of Reasons for Refusal dated Apr. 28, 2021.

*Primary Examiner* — Bao-Luan Q Le
(74) *Attorney, Agent, or Firm* — Fitch, Even, Tabin & Flannery LLP (57) ABSTRACT

A control unit includes a casing, a first exhaust fan disposed close to a first side surface of the casing to exhaust air inside the casing, a first air intake port disposed to correspond to the first exhaust fan and formed in a second side surface opposite to the first side surface, a second exhaust fan disposed adjacent to the first exhaust fan and close to the first side surface to exhaust air inside the casing, a second air intake port disposed to correspond to the second exhaust fan and formed in the second side surface, a first cooling target object disposed to correspond to the first exhaust fan, a second cooling target object disposed to correspond to the second exhaust fan, and a CPU for controlling a revolution speed of the first exhaust fan and a revolution speed of the second exhaust fan.

12 Claims, 5 Drawing Sheets

(56) References Cited

U.S. PATENT DOCUMENTS

| | | | | |
|---|---|---|---|---|
| 7,967,447 B2* | 6/2011 | Lin | ............... | G03B 21/16 |
| | | | | 353/58 |
| 7,976,171 B2* | 7/2011 | Kameoka | ........... | G03B 21/2086 |
| | | | | 353/57 |
| 8,096,662 B2* | 1/2012 | Suzuki | ............... | G02B 27/1006 |
| | | | | 353/81 |
| 2002/0001065 A1* | 1/2002 | Takizawa | ............... | G03B 21/16 |
| | | | | 353/31 |
| 2002/0163626 A1* | 11/2002 | Takizawa | ............... | G03B 21/16 |
| | | | | 353/52 |
| 2006/0187420 A1* | 8/2006 | Wei | ............... | G03B 21/16 |
| | | | | 353/61 |
| 2007/0285928 A1* | 12/2007 | Suzuki | ............... | G03B 33/06 |
| | | | | 362/296.07 |
| 2009/0034192 A1* | 2/2009 | Lin | ............... | G03B 21/16 |
| | | | | 361/695 |
| 2009/0040468 A1* | 2/2009 | Kameoka | ............... | G03B 21/16 |
| | | | | 353/52 |
| 2013/0077054 A1* | 3/2013 | Lim | ............... | G03B 21/16 |
| | | | | 353/57 |
| 2017/0038665 A1* | 2/2017 | Chen | ............... | H04N 9/3144 |
| 2020/0141561 A1* | 5/2020 | Grottenmueller | ....... | C08L 83/16 |

FOREIGN PATENT DOCUMENTS

| | | |
|---|---|---|
| JP | 2000-242340 A | 9/2000 |
| JP | 2011-151131 A | 8/2011 |
| JP | 2015-222301 A | 12/2015 |

* cited by examiner

ELECTRONIC UNIT INCLUDING A FAN, PROJECTOR INCLUDING A FAN, AND COOLING CONTROL METHOD FOR THE ELECTRONIC UNIT INCLUDING THE FAN

CROSS-REFERENCE TO RELATED APPLICATION

This patent application is based upon and claims the benefit of priority under 35 USC 119 from Japanese Patent Application No. 2019-100941 filed on May 30, 2019, and Japanese Patent Application No. 2019-056487 filed on Mar. 25, 2019, the entire disclosures of which, including the descriptions, claims, drawings, and abstracts, are incorporated herein by reference in their entireties.

BACKGROUND OF THE INVENTION

Field of the Invention

The present invention relates to an electronic unit, a projector, and an electronic unit cooling control method.

Description of the Related Art

There has conventionally been proposed a projector in which an image formed using a micromirror display device called a digital micromirror device (DMD) or a liquid crystal panel is projected on to a screen. For example, an image projection device disclosed by JP-2015-222301 A includes a first heat sink for a first light source, the first heat sink being disposed on a side of the first light source, a second heat sink for a second light source, the second heat sink being disposed on a side of the second light source, and a first cooling fan which is an axial flow blower disposed between the first heat sink and the second heat sink in such a manner as to be parallel to both the heat sinks. In an interior of the image projection device, the first light source, which generates higher heat than heat generated by the second light source, is disposed downstream in a flow of cooling air of the first cooling fan.

In the image projection device described above, since the first heat sink, the second heat sink, and the first cooling fan are disposed in series, a negative air pressure can be increased. However, when disposing the first cooling fan nearer to cooling target objects such as the first heat sink and the second heat sink, inside noise may be increased from time to time by wind noise generated by cooling air which passes over the cooling target objects. Then, when the revolution speed of the first cooling fan is decreased to reduce the level of such inside noise, the amount of air to be delivered by the first cooling fan is also decreased, whereby it is assumed that a sufficient cooling effect cannot be obtained.

SUMMARY OF THE INVENTION

The present invention has been made in view of the situations described above, and an object of the present invention is to provide an electronic unit configured to cool a cooling target while suppressing noise for quietening, a projector, and a cooling control method.

According to an aspect of the present invention, there is provided an electronic unit including a casing, a first exhaust fan disposed close to a first side surface of the casing and configured to exhaust air inside the casing, a first air intake port disposed in such a manner as to correspond to the first exhaust fan and formed in a second side surface opposite to the first side surface, a second exhaust fan disposed close to the first side surface of the casing, installed adjacent to the first exhaust fan, and configured to exhaust air inside the casing, a second air intake port disposed in such a manner as to correspond to the second exhaust fan and formed in the second side surface opposite to the first side surface, a first cooling target object disposed in such a manner as to correspond to the first exhaust fan, a second cooling target object disposed in such a manner as to correspond to the second exhaust fan, and a CPU configured to control a revolution speed of the first exhaust fan and a revolution speed of the second exhaust fan.

In addition, according to another aspect of the present invention, there is provided a projector including a casing, a light source unit, a display device configured to generate image light from light source light emitted from the light source unit, a projection optical system configured to project the image light emitted from the display device on to a screen, a first exhaust fan disposed close to a first side surface of the casing and configured to exhaust air inside the casing, a first air intake port disposed in such a manner as to correspond to the first exhaust fan and formed in a second side surface opposite to the first side surface, a second exhaust fan disposed close to the first side surface of the casing, installed adjacent to the first exhaust fan, and configured to exhaust air inside the casing, a second air intake port disposed in such a manner as to correspond to the second exhaust fan and formed in the second side surface opposite to the first side surface, a first cooling target object disposed in such a manner as to correspond to the first exhaust fan, a second cooling target object disposed in such a manner as to correspond to the second exhaust fan, and a CPU configured not only to control the light source unit and the display device but also to control a revolution speed of the first exhaust fan and a revolution speed of the second exhaust fan.

Further, according to a further aspect of the present invention, there is provided a cooling control method for an electronic unit, the electronic unit including a casing, a first exhaust fan disposed close to a first side surface of the casing and configured to exhaust air inside the casing, a first air intake port disposed in such a manner as to correspond to the first exhaust fan and formed in a second side surface opposite to the first side surface, a second exhaust fan disposed close to the first side surface of the casing, installed adjacent to the first exhaust fan, and configured to exhaust air inside the casing, a second air intake port disposed in such a manner as to correspond to the second exhaust fan and formed in the second side surface opposite to the first side surface, a first cooling target object disposed in such a manner as to correspond to the first exhaust fan, a second cooling target object disposed in such a manner as to correspond to the second exhaust fan, and a CPU, wherein the CPU is configured to control a revolution speed of the first exhaust fan and a revolution speed of the second exhaust fan.

DETAILED DESCRIPTION OF THE PREFERRED EMBODIMENTS

Figure 1:
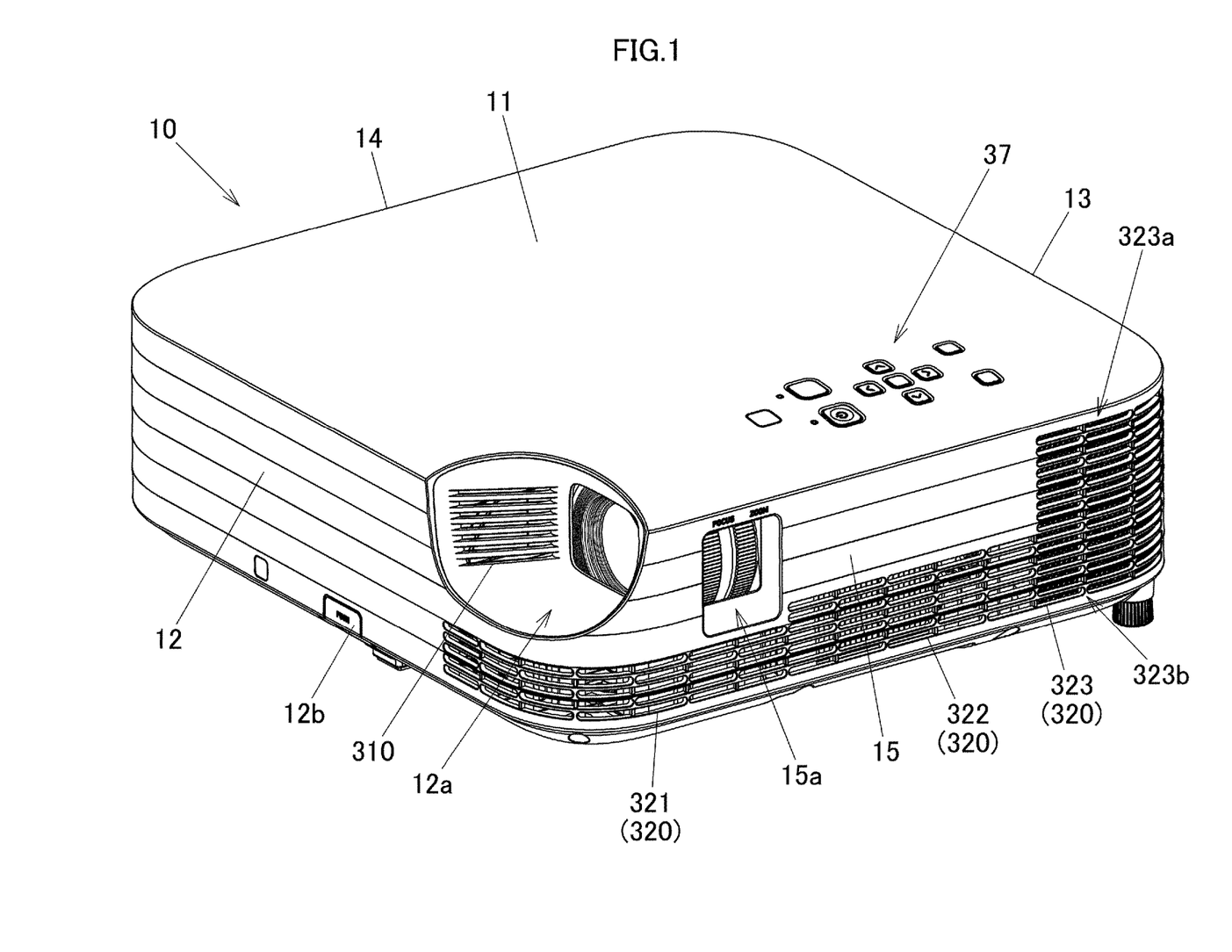
FIG. 1 is an external perspective view of a projector according to an embodiment of the present invention as seen from a left front of the projector.
Figure 2:
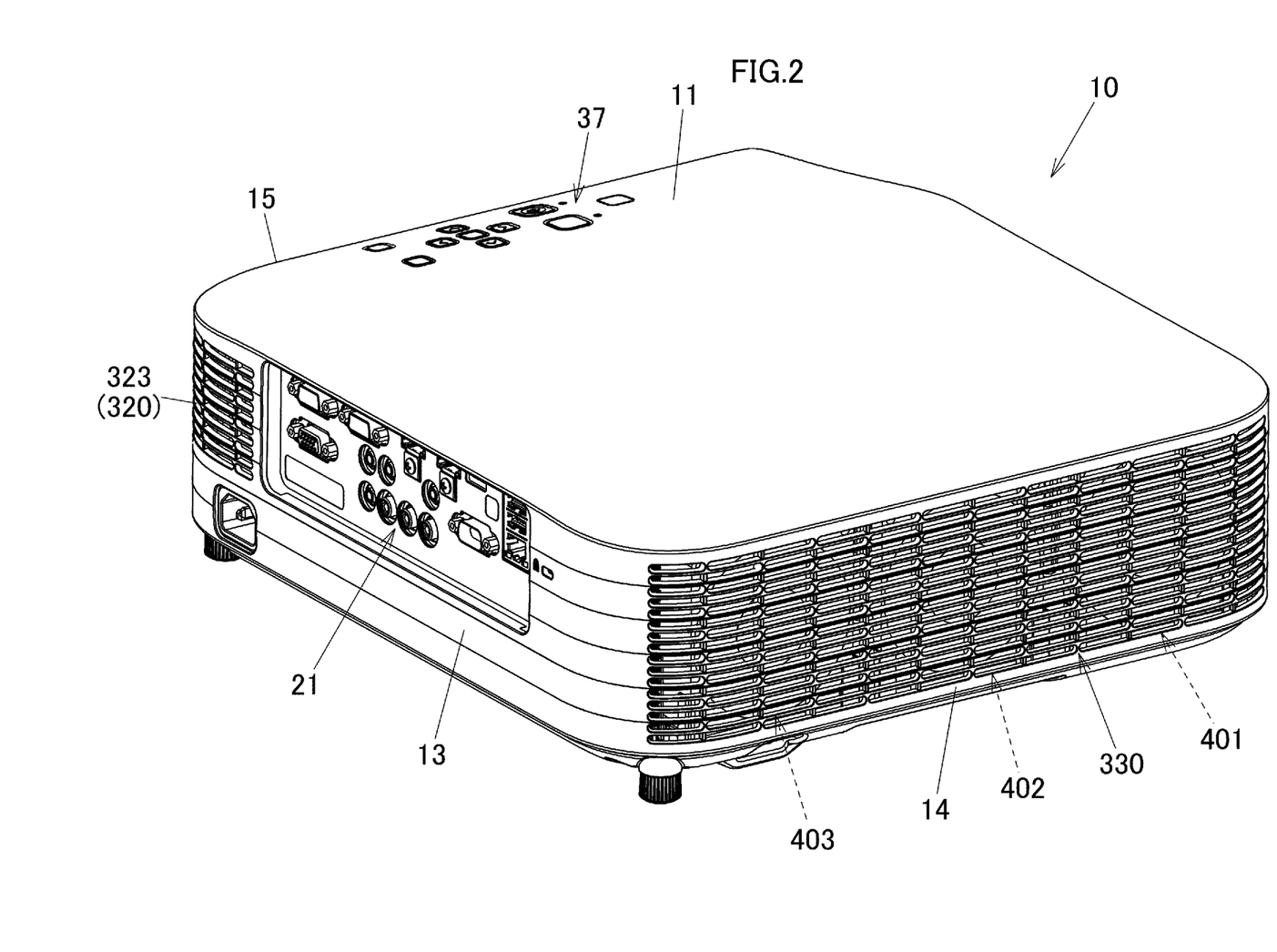
FIG. 2 is an external perspective view of the projector according to the embodiment of the present invention as seen from a right rear of the projector.

Hereinafter, a mode for carrying out the present invention will be described. FIGS. 1 and 2 are external perspective views of a projector 10 as seen from a left front and a right rear of the projector 10, respectively. The projector 10 is formed into a substantially rectangular parallelepiped. A casing of the projector 10 has side panels such as a front panel 12, a rear panel 13, a right panel 14, and a left panel 15. In the following description of the embodiment, when left and right are referred to in relation to the projector 10, they denote left and right directions, respectively, with respect to a projecting direction of the projector 10. Additionally, when front and rear are referred to in relation to the projector 10, they denote front and rear directions, respectively, with respect to the projecting direction of the projector 10.

A keys/indicators unit 37 is provided on an upper panel 11 of the casing of the projector 10. This keys/indicators unit 37 includes keys and indicators for use in executing various settings, and the keys and indicators include, for example, a power supply switch key, a power indicator, a projection switch key, an overheat indicator, and the like. The power indicator informs whether a power supply is on or off. The projection switch key switches on or off the projection by the projector 10. The overheat indicator informs of an overheat condition occurring in a light source unit, a display device, a control circuit, or the like when they really overheat.

A projected image controller 15a provided in the left panel 15 includes one or a plurality of rotational knobs. When the rotational knobs are operated, the position of a movable lens of a projection optical system 220 is adjusted, whereby the size and focus of a projected image can be controlled. The projection optical system 220 will be described using FIG. 4 later. Additionally, the projector 10 includes an Ir reception unit, not shown, configured to receive a control signal from a remote controller.

A light emitting portion 12a, which is depressed into a mortar shape, is provided at a left front corner of the projector 10. An air intake port 310, which is made up of a plurality of rectangular hole portions, is provided in a right inner surface of the light emitting portion 12a. Additionally, a height adjustment button 12b is provided in a lower edge of the front panel 12. A support leg is provided above the height adjustment button 12b in an interior of the projector 10. In the projector 10, the support leg can be caused to appear from or disappear into a lower surface of the projector 10 while the height adjustment button 12b is being depressed. The support leg can be fixed at any projection height by operating the height adjustment button 12b to thereby adjust the height or inclination of the projector 10.

An air intake port 320 is provided in the left panel 15 (a second side surface) including portions of the front panel 12 and the rear panel 13. In a left side view, the air intake port 320 includes a plurality of intake ports 321 to 323 of which upper ends differ in height from one another. The air intake port 321, which constitutes a front air intake port, is disposed in the left front corner of the projector 10 below the light emitting portion 12a and the projected image controller 15a. As a result, the air intake port 321 (a second air intake port) is also formed in a left end portion of the front panel 12. The air intake port 322 (a first air intake port), which is disposed at the rear of the air intake port 321, is formed in such a manner that its upper end is located higher than that of the air intake port 321 and is disposed at a central portion in a front-rear direction of the projector 10. The air intake port 323 (the second air intake port), which is disposed at the rear of the air intake port 322, is formed in such a manner that its upper end is located higher than that of the air intake port 322 and is disposed in a left rear corner portion of the projector 10 (also refer to FIG. 2). As a result, the air intake port 323 is also formed in part of a left end portion of the rear panel 13.

An air exhaust port 330 is provided over substantially a whole surface of the right panel 14 shown in FIG. 2 in a front-rear direction and an up-down direction of the right panel 14. An overall shape of the exhaust port 330 is a substantially rectangular shape that is elongated in the front-rear direction. The intake port 320 and the exhaust port 330 are each made up of a plurality of elliptic hole portions.

An input/output connector unit 21 is provided on the rear panel 13, and this input/output connector unit 21 includes various input/output connectors such as terminals including a USB terminal, an image signal input D-SUB terminal, an S terminal, an RCA terminal, an HDMI (a registered trademark) terminal, and the like, a power supply adaptor plug, and the like.

Figure 3:
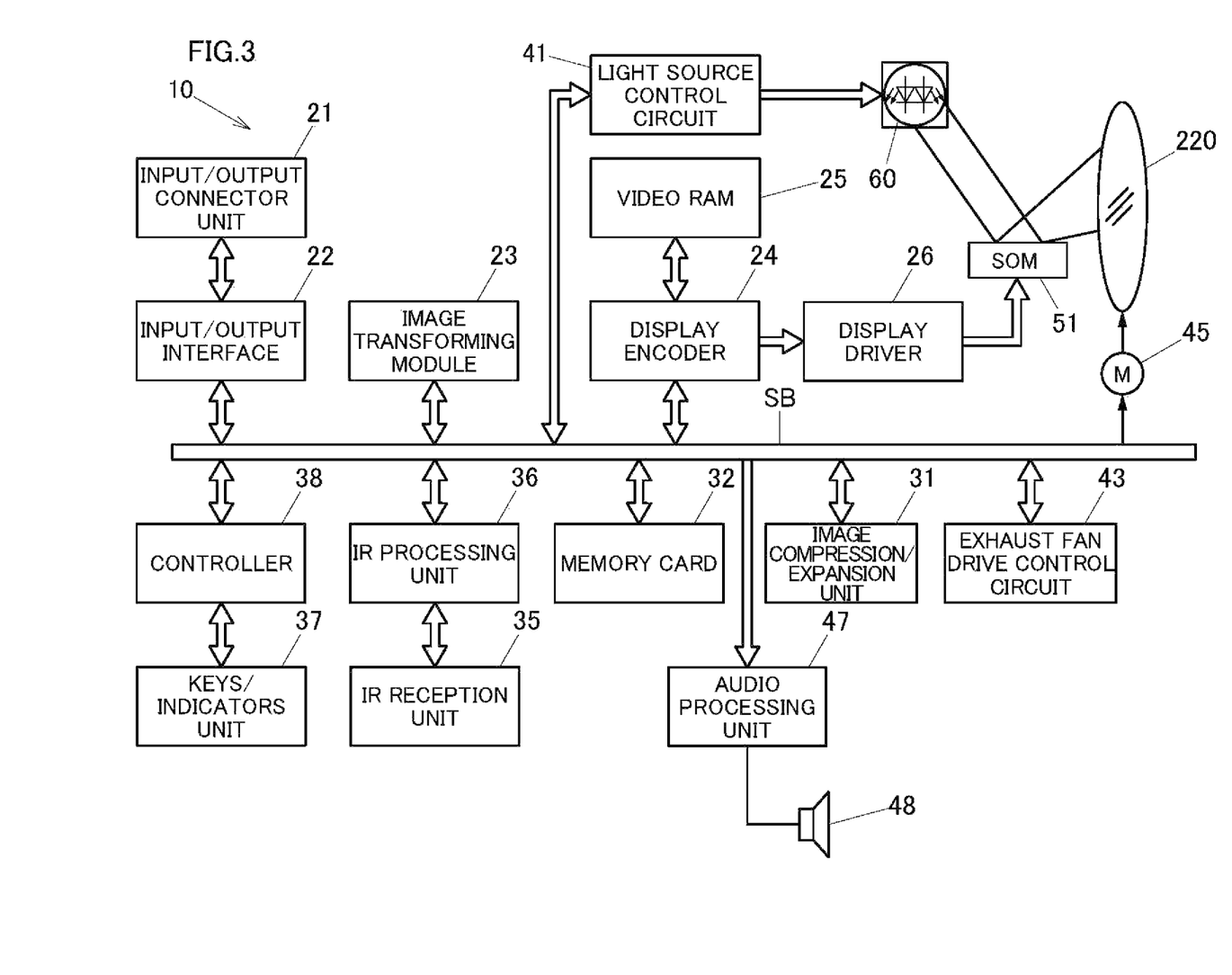
FIG. 3 is a diagram showing functional circuit blocks of the projector according to the embodiment of the present invention.

FIG. 3 is a block diagram illustrating functional circuit blocks of the projector 10. A projector control unit is made up of CPU including an image transforming module 23 and a controller 38, a front end unit including an input/output interface 22, and a formatter unit including a display encoder 24 and a display driver 26. Image signals of various standards which are inputted from the input/output connector unit 21 are sent, via the input/output interface 22 and a system bus (SB), to the image transforming module 23, where the image signals are transformed so as to be unified into an image signal of a predetermined format which is suitable for display. Thereafter, the unified image signal is outputted to the display encoder 24.

The display encoder 24 deploys the inputted image signal on a video RAM 25 for storage in it and generates a video signal from the contents stored in the video RAM 25, outputting the video signal so generated to the display driver 26.

The display driver 26 drives a display device 51, which is a spatial optical modulator (SOM), at an appropriate frame rate according to the image signal outputted from the display encoder 24. Then, in the projector 10, pencils of light emitted from a light source unit 60 are shined on to the display device 51 by way of a light guiding optical system to thereby form an optical image by light reflected from the display device 51, and the image so formed is then projected onto a screen, not shown, for display by way of a projection optical system 220. A movable lens group of this projection optical system 220 is driven by a lens motor 45 for zooming and focusing.

An image compression/expansion unit 31 performs a recording process in which a luminance signal and a color difference signal of an image signal are data compressed through processing of Adaptive Discrete Cosine Transform (ADCT) and Huffman coding, and the compressed data is sequentially written on a memory card 32, which constitutes a detachable recording medium. Further, with the projector 10 set in a reproducing mode, the image compression/expansion unit 31 reads out the image data recorded in the memory card 32 and expands the individual image data that makes up a series of dynamic images frame by frame. Then, the image compression/expansion unit 31 outputs the image data to the display encoder 24 by way of the image transforming module 23. Thus, the image compression/expansion unit 31 can display dynamic images based on the image data stored in the memory card 32.

The controller 38 governs the control of operations of individual circuitries inside the projector 10 and includes CPU, ROM storing fixedly operation programs such as various settings, RAM that is used as a work memory, and the like.

The keys/indicators unit 37 is made up of the keys and indicators that are provided on the casing of the projector 10. Operation signals from the keys/indicators unit 37 are sent out directly to the controller 38. Key operation signals from the remote controller are received by the IR reception unit 35 and are then demodulated into a code signal at an Ir processing unit 36 for output to the controller 38.

The controller 38 is connected with an audio processing unit 47 by way of the system bus (SB). This audio processing unit 47 includes a circuitry for a sound source such as a PCM sound source. With the projector 10 set in a projection mode and the reproducing mode, the audio processing unit 47 converts audio data into analog signals and drives a speaker 48 to output loudly sound or voice based on the audio data.

The controller 38 controls a light source control circuit 41. The light source control circuit 41 controls separately the operation of an excitation light shining device of the light source unit 60 so that light in predetermined wavelength ranges required in generating an image is emitted from the light source unit 60. Additionally, the light source control circuit 41 controls a synchronizing timing of a luminescent wheel 101 and a color wheel 201 (refer to FIG. 5) based on a command from the controller 38.

Additionally, the controller 38 causes an exhaust fan drive control circuit 43 to detect temperatures with a plurality of temperature sensors which are provided in the light source unit 60 and the like so as to control revolution speeds of a first exhaust fan 402, and second exhaust fans 401, 403 based on the results of the temperature detections. Further, the controller 38 also causes the exhaust fan drive control circuit 43 to keep the first exhaust fan 402 and the second exhaust fans 401, 403 fans revolving by use of a timer or the like even after a power supply to a main body of the projector 10 is switched off. Alternatively, the controller 38 causes the exhaust fan drive control circuit 43 to switch off the power supply of the main body of the projector 10 depending upon the results of the temperature detections by the temperature sensors.

Figure 4:
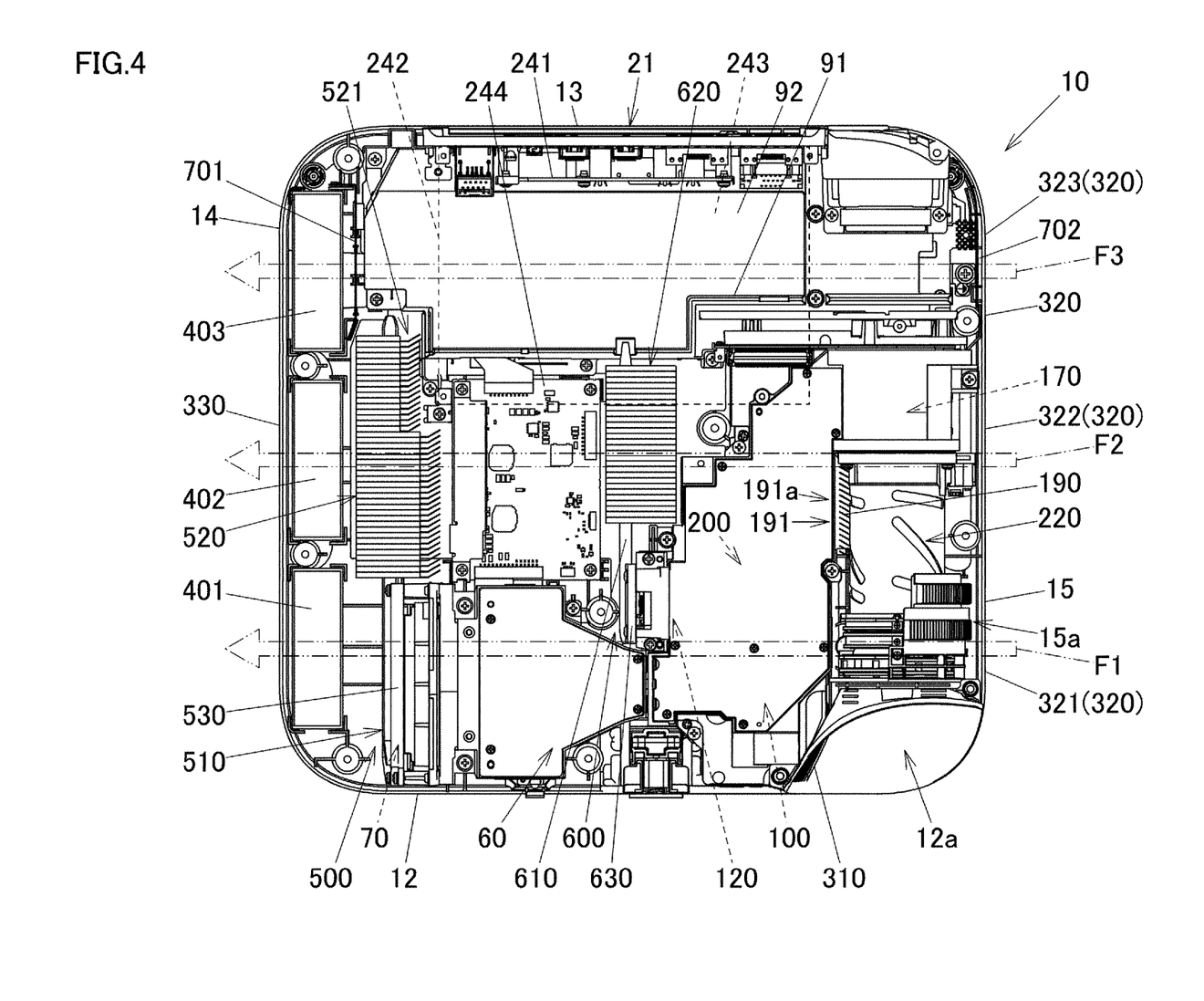
FIG. 4 is a schematic plan view showing an internal structure of the projector according to the embodiment of the present invention.

FIG. 4 is a schematic plan view illustrating an internal structure of the projector 10. The projector 10 includes the light source unit 60, a light source-side optical system 170, and the projection optical system 220 at a front portion and a central portion in the front-rear direction of the projector 10. The projector 10 also includes a circuit board 241 which is connected with the input/output connector unit 21, circuit boards 242, 243 which include a power supply circuit block, a light source control flock, and the like, and a circuit board 244 which is connected with the circuit board 242 and which has drive circuits for drive portions (an excitation light shining device 70, a red light source device 120, a luminescent wheel device 100, a color wheel device 200, and the like) in the light source unit 60 at a rear portion of the projector 10.

In the projector 10, a plate-like partition portion 91 configured to divide a portion inside projector 10 into a front portion and a rear portion and a plate-like partition portion 92 configured to divide a portion inside the projector 10 which lies behind the partition portion 91 into an upper portion and a lower portion. The partition portion 91 is formed into a step-like shape which extends in a left-right direction with plate surfaces oriented in the front-rear direction. The partition portion 92 is formed to extend in the left-right direction below the partition portion 91 with plate surfaces oriented in the up-down direction. The circuit board 241 is disposed at the rear of the partition portion 92 with plate surfaces oriented in the front-rear direction. In addition, the circuit board 242, which is indicated by a broken line, is disposed above the partition portions 91, 92 and the circuit board 241. The circuit board 243 is disposed on a lower surface side, not shown, of the partition portion 92. A transformer circuit including a condenser of a relatively great capacity, a regulator, and the like is formed on the circuit board 243 (not shown). In this way, a cylindrical flow path F3 provided in such a manner as to extend in the left-right direction while being substantially surrounded on four sides by the circuit boards 241, 242 and the partition portions 91, 92 is formed at the rear of the light source unit 60.

In the projector 10, the plurality of exhaust fans such as the first exhaust fan 402 and the second exhaust fans 401, 403 are disposed close to an inner side of the right panel 14 (a first side surface) of the casing. The second exhaust fan 401 and the second exhaust fan 403 are provided on both sides of the first exhaust fan 402. The first exhaust fan 402 and the second exhaust fans 401, 403 are axial flow fans which are provided to be aligned side by side in such a manner as to be substantially parallel to the right panel 14 so as to send air towards the exhaust port 330. Consequently, a plurality of substantially parallel flow paths F1 to F3 are formed in such a manner as to correspond to the first exhaust fan 402 and the second exhaust fans 401, 403 inside the projector 10, whereby cooling air flows as a whole from the left panel 15 where the intake ports 310, 320 are formed towards the right panel 14 where the exhaust port 330 is formed in the projector 10. In this way, the projector 10 adopts for cooling a pull-type cooling system where the first exhaust fan 402 and the second exhaust fans 401, 403 are disposed at the side of the projector 10 in which the exhaust port 330 is formed, the side lying downstream of heat sources in a flow of cooling air.

Here, referring to FIG. 5, configurations on peripheries of the light source unit 60 and the light source-side optical system 170 will be described. The light source unit 60 includes the excitation light shining device 70, which constitutes not only a light source of light having a wavelength in the blue wavelength range or, simply, light in the blue wavelength range but also an excitation light source, a green light source device 80, which constitutes a light source of light having a wavelength in the green wavelength range or, simply, light in the green wavelength range, a red light source device 120, which constitutes a light source of light having a wavelength in the red wavelength range or, simply, light in the red wavelength range, and a color wheel device 200. The green light source device 80 is made up of the excitation light shining device 70 and a luminescent wheel device 100.

A light guiding optical system 140 is disposed in the light source unit 60. This light guiding optical system 140 guides light emitted from the excitation light shining device 70, light emitted from the green light source device 80, and light emitted from the red light source device 120 to the light source side optical system 170.

The excitation light shining device 70 is disposed in the vicinity of the front panel 12 of the projector 10. The excitation light shining device 70 includes a light source group made up of a plurality of blue laser diodes 71, collective lenses 77, 78, and a diffuse plate 79. The blue laser diodes 71 are semiconductor light emitting elements and are disposed in such a manner that optical axes thereof are parallel to the rear panel 13.

The light source group described above is formed by arranging the plurality of laser diodes 71 into a matrix configuration. Collimator lenses 73 are disposed individually on the optical axes of the blue laser diodes 71 so as to convert light emitted from the corresponding blue laser diodes 71 into parallel light to thereby enhance the directivity of the emitted light. The collective lens 77 and the collective lens 78 contract pencils of light emitted from the blue laser diodes 71 in one direction and emit them towards the diffuse plate 79. The diffusing plate 79 diffusion transmits light in the blue wavelength range that is incident thereon to a dichroic mirror 141 that is disposed on a side of the luminescent wheel 101.

The excitation light shining device 70 is cooled by a heat sink 500 and the like which are disposed inside the projector 10. The heat sink 500 is connected with the excitation light shining device 70 by a base plate 530. Fins 520 of the heat sink 500 are connected with the base plate 530 via a heat pipe 510. The fins 520 are disposed close to the first exhaust fan 402 at a central portion in the front-rear direction of the projector 10 (also refer to FIG. 4).

As shown in FIG. 4, which is the schematic plan view illustrating the internal structure of the projector 10, a bent portion 521, which is bent obliquely to the rear, is formed at an inner edge portion of a plate body of each of the fins 520, the inner edge portion lying to face the interior of the projector 10. The bent portion 521 is bent so obliquely to the rear that the circuit board 244 and the like which are provided in the interior of the projector 10 are almost invisible when the interior of the projector 10 is looked in from the side of the right panel 14. Consequently, the safety measure standards against failures of the circuit board 244 and the like can be met.

Further, the plurality of circuit boards 241 to 243 are disposed in the flow path F3 formed at the back of the interior of the projector 10. Plate-like metallic mesh plates 701, 702, each including a plurality of open holes formed therein, are disposed on inner sides of the second exhaust fan 403 and the air intake port 323, respectively, the inner sides both facing the interior of the projector 10. The open holes in the metallic mesh plates 701, 702 are formed thinner than the hole portions in the air intake ports 310, 320 and the exhaust port 330. For example, the open holes in the metallic mesh plates 701, 702 are formed to be 5 mm or less long and 1 mm or less wide. Consequently, similar to the bent portions 521 of the fins 520, the metallic mesh plates 701, 702 can also meet the safety measure standards against the failures of the circuit boards 241 to 243 in the interior of the projector 10. In the projector 10 according to the present embodiment, by providing the bent portions 521 on the fins 520, metallic mesh plates like the metallic mesh plates 701, 702 do not have to be provided for the flow path F2 that corresponds to the circuit board 244, whereby the number of parts for use for the safety measures can be reduced. Additionally, since the bent portions 521 are provided at the inner sides of the fins 520 which lie to face the interior of the projector 10, compared with a case where the bent portions 521 are provided at sides of the fins 520 which lie to face the first exhaust fan 402, an increase in flow resistance in the flow path F2 can be suppressed more.

Figure 5:
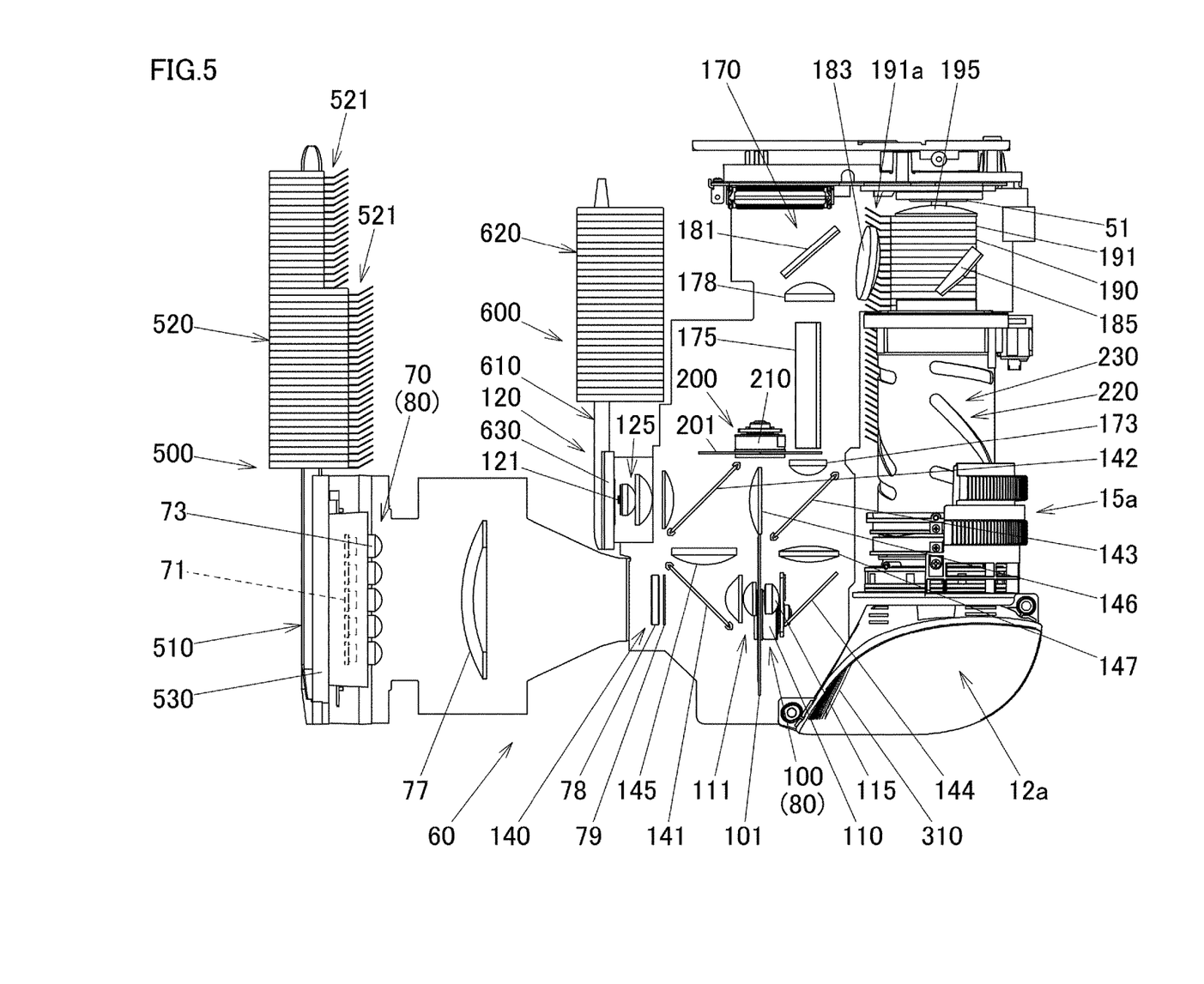
FIG. 5 is a schematic plan view showing configurations on peripheries of a light source unit and a light source side optical system according to the embodiment of the present invention.

The luminescent wheel device 100 shown in FIG. 5 is disposed on an optical path of excitation light emitted from the excitation light shining device 70 and in the vicinity of the front panel 12. The luminescent wheel device 100 includes the luminescent wheel 101, a motor 110, a collective lens group 111, and a collective lens 115. The luminescent wheel 101 is disposed in such a manner as to be at right angles to an axis of light emitted from the excitation light shining device 70. The motor 110 drives and rotates the luminescent wheel 101.

The luminescent wheel 101 is formed into a disk-like shape and rotates by being driven by the motor 110. Although not shown, the luminescent wheel 101 includes a luminescent light emitting area and a transmission area which are provided end to end in a circumferential direction. A base material of the luminescent wheel 101 can be formed of a metallic material such as copper, aluminum, or the like. A surface of the base material that lies to face the excitation light shining device 70 is mirror finished through silver deposition or the like. In the luminescent light emitting area, a green luminescent material layer is formed on the mirror finished surface. The luminescent light emitting area receives light in the blue wavelength range from the excitation light shining device 70 as excitation light and then emits luminescent light in the green wavelength range in every direction. This luminescent light is emitted from the luminescent wheel 101 towards the right panel 14 and is then incident on the collective lens group 111.

The transmission area of the luminescent wheel 101 can be formed by fitting a transparent material having light transmission properties in a cut-out portion formed in the base material of the luminescent wheel 101. The transparent material is formed of a transparent material such as glass or resin. Additionally, a diffuse layer may be provided on a surface of the transparent material on a side thereof onto which light in the blue wavelength range is shined or an opposite side thereto. The diffuse layer can be provided, for example, by forming minute irregularities on the relevant surface through sandblasting. Light in the blue wavelength range emitted from the excitation light shining device 70 to be incident on the transmission area is transmitted or diffuse transmitted through the transmission area and is then incident on the collective lens 115.

The collective lens group 111 collects pencils of light in the blue wavelength range emitted from the excitation light shining device 70 to the luminescent wheel 101 and collects luminescent light emitted from the luminescent wheel 101 in the direction of the right panel 14. The collective lens 115 collects a pencil of light emitted from the luminescent wheel 101 in the direction of a left panel 15.

The red light source device 120 includes a red light emitting diode 121 that is a semiconductor light emitting device disposed in such a manner as to be parallel to an axis of light emitted from the blue laser diodes 71 and a collective lens group 125 that collects light in the red wavelength range emitted from the red light emitting diode 121. The red light source device 120 is disposed in such a manner that an axis of light in the red wavelength range emitted from the red light emitting diode 121 intersects an axis of light in the green wavelength range emitted from the luminescent wheel 101 and reflected by a first dichroic mirror 141.

The red light source device 120 is cooled by a heat sink 600 disposed inside the projector 10 and the like. The heat sink 600 is connected with the red light source device 120 by a base plate 630. Fins 620 of the heat sink 600 are connected with the base plate 630 by a heat pipe 610. The fins 620 are disposed at a substantially central portion in the front-rear direction of the projector 10 (also refer to FIG. 4).

The light guiding optical system 140 includes the first dichroic mirror 141, a second dichroic mirror 142, a third dichroic mirror 143, collective lenses 145, 146, 147 that collect pencils of light, a reflection mirror 144 that reflects light in the blue wavelength range towards the third dichroic mirror 143, and the like. Hereinafter, the individual constituent members will be described.

The first dichroic mirror 141 is disposed between the diffuse plate 79 and the collective lens group 111. The first dichroic mirror 141 transmits light in the blue wavelength range towards the collective lens group 111 and reflects light in the green wavelength range in the direction of the collective lens 145 to thereby turn an axis of the light in the green wavelength range trough 90 degrees.

The light in the green wavelength range reflected by the first dichroic mirror 141 is collected by the collective lens 145 and is then incident on the second dichroic mirror 142. The second dichroic mirror 142 constitutes a light combining device configured to combine light in the green wavelength range and light in the red wavelength range into the same light axis and reflects light in the green wavelength range, while transmitting light in the red wavelength range.

Light in the green wavelength range that is reflected by the dichroic mirror 141 is collected by the collective lens 146 and is then incident on the third dichroic mirror 143 that is disposed on a side of the collective lens 146 that lies to face the left panel 15. The third dichroic mirror 143 reflects light in the red wavelength range and light in the green wavelength range and transmits light in the blue wavelength range. Consequently, the third dichroic mirror 143 reflects the light in the red wavelength range and the light in the green wavelength range that the collective lens 146 collects to the collective lens 173 to thereby guide the light in the red wavelength range and the light in the green wavelength range.

On the other hand, when the shining area on the luminescent wheel 101 on to which light in the blue wavelength range is shone stays on the transmission area, light in the blue wavelength range emitted from blue laser diodes 71 passes through the luminescent wheel 101 and is then collected by the collective lens to thereafter be guided to the reflection mirror 144. The reflection mirror 144 is disposed on an axis of light in the blue wavelength range that is transmitted or diffuse transmitted through the luminescent wheel 101. The reflection mirror 144 reflects light in the blue wavelength range and guides its light axis to the collective lens 147 that is disposed nearer to the rear panel 13 than the reflection mirror 144. The third dichroic mirror 143 transmits the light in the blue wavelength range that is collected by the collective lens 147 to guide it towards the collective lens 173.

The light source side optical system 170 includes the collective lens 173, a light tunnel 175, a collective lens 178, a light axis turning mirror 181, a collective lens 183, a shining mirror 185, and a condenser lens 195. The condenser lens 195 emits image light emitted from the display device 51 disposed on a side of the condenser lens 195 that lies to face the rear panel 13 towards the projection optical system 220, and therefore, the condenser lens 195 constitutes part of the projection optical system 220.

The collective lens 173 is disposed at an end of the light tunnel 175, the end lying to face the second dichroic mirror 143. The collective lens 173 collects light in the green wavelength range, light in the blue wavelength range and light in the red wavelength range that are guided from the third dichroic mirror 143. The light in the green, blue and red wavelength ranges that is collected by the collective lens 173 is shone onto the color wheel 201 of the color wheel device 200.

The color wheel device 200 includes the color wheel 201 and a motor 210 configured to drive to rotate the color wheel 201. The color wheel device 200 is disposed between the collective lens 173 and the light tunnel 175 in such a manner that an axis of a pencil of light emitted from the collective lens 173 is at right angles to a shining surface on the color wheel 201.

The color wheel 201 is formed into a disk-like shape and can be driven to rotate by the motor 210. The color wheel 201 includes an all color transmission area and a blue and red transmission area that are provided end to end in a circumferential direction. The all color transmission area can transmit light in the blue wavelength range, light in the green wavelength range, and light in the red wavelength range. The blue and red transmission area can transmit not only light in the blue wavelength range but also light in the red wavelength range. Light in the blue wavelength range, light in the green wavelength range, and light in the red wavelength range that are incident on the color wheel 201 are transmitted through the all color transmission area or the blue and red transmission area so that their intensities are controlled and are then guided towards the light tunnel 175, and the blue, green and red lights are incident on the light tunnel 175 as a pencil of light. The pencil of light incident on the light tunnel 175 is formed into a pencil of light of which the intensity is uniformly distributed.

The collective lens 178 is disposed on an optical axis of the light tunnel 175 at an end of the light tunnel 175 that lies to face the rear panel 13. Then, the light axis turning mirror 181 is disposed nearer to the rear panel 13 than the collective lens 178. A pencil of light emerging from an emerging port of the light tunnel 175 is collected by the collective lens 178 and is then reflected towards the left panel 15 by the light axis turning mirror 181.

The pencil of light that is reflected by the light axis turning mirror 181 is collected by the collective lens 183, whereafter the pencil of light is shone on to the display device 51 at a predetermined angle via the condenser lens 195 by the shining mirror 185. A heat sink 190 is provided below and ahead of the display device 51 (also refer to FIG. 4). The display device 51 is cooled by this heat sink 190.

In the schematic plan views shown in FIGS. 4 and 5, a bent portion 191a, which is bent obliquely to the rear, is formed at an inner edge portion of a plate body of each of fins 191, the inner edge portion lying to face the interior of the projector 10. The bent portion 191a is bent so obliquely to the rear that the circuit board 244 and the like which are provided in the interior of the projector 10 are almost invisible when the interior of the projector 10 is looked in from the side of the left panel 15. Consequently, also on the side of the projector 10 where the left panel 15 is provided, the safety measure standards against failures of the circuit board 244 and the like can be met.

Light source light that is shone on to an image forming plane of the display device 51 by the light source side optical system 170 is reflected on the image forming plane of the display device 51 and is projected on to a screen via the projection optical system 220 as projected light. Here, the projection optical system 220 is made up of the condenser lens 195, a movable lens group, and a fixed lens group, the movable and fixed lens groups being provided inside a lens barrel 230. The movable lens group 230 is configured as a variable-focus lens that can be adjusted for zooming and focusing. The movable lens group is configured to be moved automatically by the lens motor 45 or manually by using the projected image controller 15a.

When the luminescent wheel 101 and the color wheel 201 are rotated in synchronization with each other by configuring the projector 10 in the way described heretofore, and light is emitted at arbitrary timings from the excitation light shining device 70 and the red light source device 120, lights in the green, blue and red wavelength ranges are incident on the collective lens 173 via the light guiding optical system 140 and are then incident on the display device 51 via the light source side optical system 170. As a result, the display device 51 displays green, blue and red lights in a time-sharing fashion in accordance with data, thereby making it possible to project a color image on to the screen.

Next, the flow paths F1 to F3 provided in the projector 10 according to the present embodiment will be described. As has been described above, the three flow paths F1 to F3 are formed inside the casing of the projector 10 shown in FIG. 4. In the schematic plan view shown in FIG. 4, the flow paths F1 to F3 are formed in such a manner as to extend parallel to one another in the same direction.

Air flowing into the flow path F1 extending along the front panel 12 is taken in mainly from the air intake ports 310, 321. In the projector 10, air taken into the flow path F1 from the air intake port 321 positioned below the light emitting portion 12a mainly flows on a lower surface side of the lens barrel 230 and then continues to flow on a lower surface side of a portion of a casing of the light source unit 60, the portion lying on peripheries of the luminescent wheel device 100, the color wheel device 200, the red light source device 120, and the excitation light shining device 70. The air that has flowed along a lower surface of the red light source device 120 by way of a lower surface of the color wheel device 200 passes through peripheries of the heat pipe 610 and the base plate 630 of the heat sink 600 and flows on towards the excitation light shining device 70. The air that has flowed along a lower surface of the excitation light shining device 70 by way of the lower surface of the red light source device 120 and a lower surface of the luminescent wheel device 100 passes through peripheries of the heat pipe 510 and the base plate 530 of the heat sink 500 and is then exhausted to an exterior of the projector 10 from a portion of the exhaust port 330 that lies closer to the front panel 12 by way of the second exhaust fan 401. The heat pipe 510 and the base plate 530 (a second cooling target object) which constitute cooling target objects disposed inside the flow path F1 are disposed close to the second exhaust fan 401.

In addition, in the projector 10, air taken into the flow path F1 from the air intake port 310 flows mainly over an upper surface side (a surface side lying to face the upper panel 11) or along a front surface side (a surface side lying to face the front panel 12) of the casing of the light source unit 60, then passes through the periphery of the base plate 530, and is exhausted to the exterior of the projector 10 from the portion of the exhaust port 330 that lies closer to the front panel 12 by way of the second exhaust fan 401. Consequently, part of the casing of the light source unit 60 which includes the luminescent wheel device 100, the color wheel device 200, the red light source device 120, and the excitation light shining device 70, all of which constitute heat sources, a side of the heat sink 600 that lies to face the base plate 630, and a side of the heat sink 500 that lies to face the base plate 530 can mainly be cooled by the air flowing through the flow path F1.

Air flowing into the central flow path F2 is mainly taken in from the air intake port 322. In the projector 10, air taken into the flow path F2 from the air intake port 322 passes mainly through the fins 191 of the heat sink 190 disposed on a lower surface of the lens barrel 230 and then flows to a lower surface of a portion of the casing of the light source unit 60, the portion lying to face the light source side optical system 170. Thereafter, the air in the flow path F2 passes sequentially through the fins 620 of the heat sink 600, the periphery of the circuit board 244, and the fins 520 of the heat sink 500 in that order and is then exhausted from a central portion of the exhaust port 330 in the front-rear direction by way of the first exhaust fan 402. Thus, the air flowing through the flow path F2 can cool not only the fins 191, 620, 520 to thereby cool the display deice 51, the red light source device 120, and the excitation light shining device 70 but also the portion of the casing of the light source unit 60 that lies to face the light source side optical system 170 and the circuit board 244.

Air taken into the flow path F3 formed closest to the rear panel 13 is mainly taken in from the air intake port 323. In the projector 10, air taken into the flow path F3 from an upper air intake area 323a (refer to FIG. 1) of the air intake port 323 flows mainly through a substantially cylindrical space defined by the partition portions 91, 92 that are disposed at the rear of the light source unit 60 and the circuit boards 241, 242. In addition, air taken into the flow path F3 from a lower air intake area 323b (refer to FIG. 1) of the air intake port 323 flows mainly through a substantially cylindrical space defined by lower edge sides of the partition portion 91 and the circuit board 241, the partition portion 92, and a bottom surface portion, not shown, of the projector 10. Thus, the air taken into the flow path F3 flows through the flow path F3 while being divided into an upper flow path and a lower flow path that are divided by the partition portion 92. The air flowing through the upper flow path of the flow path F3 can cool mainly the circuit boards 241, 242. The air flowing through the lower flow path of the flow path F3 can cool mainly the circuit board 243 and a lower edge portion of the circuit board 241. In the air flowing through the flow path F3, the air flowing through the upper flow path and the air flowing through the lower flow path are allowed to merge with each other at a portion just before the second exhaust fan 403 and is then exhausted to the exterior of the projector 10 from a portion of the exhaust port 330, the portion lying to face the rear panel 13, by way of the second exhaust fan 403. The second exhaust fan 403 is disposed close to the circuit boards 241, 243 (a second cooling target object) that constitute cooling target objects disposed within the flow path F3. Thus, the air flowing through the flow path F3 can cool mainly the circuit boards 241, 242, 243.

In the present embodiment, heat values of the display device 51, the luminescent wheel device 100, the red light emitting diode 121, and the blue laser diode 71 increase in that order. For example, thermal energies generated from these heat sources are as follows: the display device 51 generates a thermal energy of 10 [W]; the luminescent wheel 101 generates a thermal energy of 15 to 20 [W]; the red light source device 120 including the red light emitting diode 121 generates a thermal energy of 25 [W]; and the excitation light shining device 70 including the blue laser diodes 71 generates a thermal energy of 100 [W]. Similar to the luminescent wheel 101, the color wheel 201 generates a thermal energy of 15 to 20 [W]. Thus, the heat value of the red light source device 120 is a medium heat value that is greater than those of the display device 51, the luminescent wheel device 100 and the color wheel device 200. Additionally, the heat value of the excitation light shining device 70 is greater than that of the red light source device 120.

Consequently, in the interior of the projector 10, the cooling target objects (the second cooling target object) that are disposed in the flow path F1 that corresponds to the second exhaust fan 401 are disposed so that the heat value of the cooling target object disposed closer to the air intake ports 310, 321 that constitute an upstream side of a flow of cooling air becomes smaller than the heat value of the cooling target object disposed closer to the exhaust port 330 that constitutes a downstream side of the flow of cooling air.

In the cooling target objects (the first cooling target object) disposed in the flow path F2 that corresponds to the first exhaust fan 402, the heat values of the fins 191 of the heat sink 190 for the display device 51, the fins 620 of the heat sink 600 for the red light source device 120, and the fins 520 of the heat sink 500 for the excitation light shining device 70 increase sequentially in that order. Due to this, the cooling target objects in the flow path F2 are disposed so that the heat value of the cooling target object disposed closer to the air intake port 322 that constitutes an upstream side of a flow of cooling air becomes smaller than the heat value of the cooling target object disposed closer to the exhaust port 330 that constitutes a downstream side of the flow of cooling air. Thus, in the flow path F1 and the flow path F2, air whose temperature is lower than those of the corresponding cooling target objects that are aligned in series along the corresponding flow paths can be applied to those cooling target objects, whereby the cooling target objects can be cooled efficiently.

Further, since the cooling target objects (the second cooling target object) in the flow path F3 that corresponds to the second exhaust fan 403 are mainly the circuit boards 241, 242, 243 that are disposed along the flow path extending in the left-right direction, the circuit boards 241, 242, 243 can be cooled efficiently.

In the present embodiment, the pluralities of fins 191, 620, 520, which constitute the main cooling target objects, are disposed in series in the central flow path F2 that corresponds to the first exhaust fan 402. The flow path F2 is positioned at the central portion in the projector 10, and the flow paths F1, F3, which are positioned adjacent to the flow path F2, are formed so as to extend parallel to the flow path F2 or so that air flowing therethrough flows parallel to air flowing in the flow path F2, and therefore, the air flow resistance in the flow path F2 becomes relatively small. In addition, the first exhaust fan 402 and the second exhaust fans 401, 403 are disposed so as to correspond substantially to a whole area of the right panel 14, thereby making it possible to obtain such a great air blowing capacity that air is allowed to flow over the whole area in the interior of the projector 10. As a result, the cooling effect for the fins 191, 620, 520 that correspond to the first exhaust fan 402 can be enhanced, as a result of which an increase in temperature at the red light source device 120 and the excitation light shining device 70, which constitute the heat sources, can be suppressed.

In this way, in the present embodiment, the fins 191, 620, 520 are disposed at the central portion of the projector 10 where the flow path F2 is formed, and the central first exhaust fan 402 can be made to function as a main cooling fan, and the second exhaust fans 401, 403 that are disposed at the sides of the first exhaust fan 402 can be made to function as auxiliary cooling fans.

In addition, revolution speeds of the second exhaust fans 401, 403, which are provided at two locations at the sides of the first exhaust fan 402 which constitutes a main cooling fan in such a manner as to be close and parallel to the first exhaust fan 402, are caused to be faster than a revolution speed of the first exhaust fan 402. As a result, even though pieces of noise generated by the exhaust fans 401 to 403 are superposed, frequencies constituting peaks of the pieces of noise generated by the exhaust fans 401 to 403 shift from one another, whereby noise levels of the pieces of noise so generated can be prevented from being strengthened by one another at a specific frequency. Thus, the noise generated in the projector 10 can be quietened while preventing a reduction in the overall air blowing capacity of the projector 10. In addition, when the revolution speeds of the second exhaust fans 401, 403, which constitute the auxiliary cooling fans, are caused to be faster than the revolution speed of the first exhaust fan 402, the fins 520 whose heat value is relatively great can be disposed close to the first exhaust fan 402 while quietening the noise. Consequently, the excitation light shining device 70, which constitutes the heat source with which the fins 520 are connected, can be cooled effectively.

Since the fins 520 (the first cooling target object) are disposed close to the first exhaust fan 402, when the revolution speed of the first exhaust fan 402, which constitutes the main cooling fan, is caused to be faster than the revolution speeds of the second exhaust fans 401, 403, which constitute the auxiliary cooling fans, the noise is increased.

In contrast to this, since a distance between the second exhaust fan 401, which constitutes the auxiliary cooling fan, and the heat pipe 510 and the base plate 530 (the second cooling target object) is greater than a distance between the first exhaust fan exhaust fan 402 and the fins 520 (the first cooling target object), the revolution speed of the second exhaust fan 401, which constitutes the auxiliary cooling fan, can be caused to be faster than the revolution speed of the first exhaust fan 402. In addition, since a distance between the second exhaust fan 403, which constitutes the auxiliary cooling fan, and the circuit boards 241, 243 (the second cooling target object) is also greater than the distance between the first exhaust fan exhaust fan 402 and the fins 520 (the first cooling target object), the revolution speed of the second exhaust fan 403, which constitutes the auxiliary cooling fan, can be caused to be faster than the revolution speed of the first exhaust fan 402. In this way, the noise can be reduced by making the revolution speeds of the auxiliary cooling fans faster.

Depending on the projection modes, the revolution speeds of the exhaust fans can be switched between a case where the revolution speed of the first exhaust fan 402 (the main cooling fan) is caused to be the same as the revolution speeds of the second exhaust fans 401, 403 (the auxiliary cooling fans) and a case where the revolution speed of the first exhaust fan 402 (the main cooling fan) is caused to differ from the revolution speeds of the second exhaust fans 401, 403 (the auxiliary cooling fans).

Additionally, depending on the results of temperature detections made by a plurality of temperature sensors provided in the projector 10, although there may be a case where the revolution speed of the first exhaust fan 402 is increased and decreased so as to cool down the heat sources to thereby suppress an increase in the temperatures of the heat sources, in this case, too, the revolution speeds of the second exhaust fans 401, 403 are set so as to be faster than the revolution speed of the first exhaust fan 402. Although negative pressures in the flow paths F1, F3 can be increased by increasing the revolution speeds of the second exhaust fans 401, 403, in the event that the flow resistances in the flow paths F1, F3 are too low when compared with the flow resistance in the flow path F2, cooling air is hardly allowed to flow through the flow path F2. To cope with this, for example, the size or positional arrangement of the open holes in the metallic mesh plates 701, 702 or the numbers of metallic mesh plates 701, 702 may be set as required to prevent a difference in flow resistance between the flow paths F1, F3 and the flow path F2 from getting too great.

In addition, a relationship between the revolution speed of the second exhaust fan 401 and the revolution speed of the second exhaust fan 403 can be set as required to suppress an increase in the temperatures of the cooling target objects disposed in the flow paths F1, F3 or the levels of noise generated by the second exhaust fans 401, 403. The revolution speed of the second exhaust fan 401 can be set so as to be equal to or different from the revolution speed of the second exhaust fan 403. Alternatively, the revolution speed of the second exhaust fan 401 may bet faster or slower than the revolution speed of the second exhaust fan 403.

In the present embodiment, the distance over which the heat pipe 510 or the base plate 530 is positioned far away from the corresponding second exhaust fan 401 and the distance over which the circuit boards 241, 243 (the second cooling target object) are positioned far away from the corresponding second exhaust fan 403 are described as being greater than the distance over which the fins 520 (the first cooling target object) are positioned far away from the corresponding first exhaust fan 402. However, the distance over which the fins 520 (the first cooling target object) are positioned far away from the corresponding first exhaust fan 402 may be greater than the distance over which the heat pipe 510 or the base plate 530 is positioned far away from the corresponding second exhaust fan 401 and the distance over which the circuit boards 241, 243 (the second cooling target object) are positioned far away from the corresponding second exhaust fan 403. The distances between the cooling fans 401 to 403 and the corresponding cooling target objects may be the same.

In the present embodiment, the projector 10 is described as including the three exhaust fans in total, that is, the first exhaust fan 402, which constitutes the main cooling fan, and the second exhaust fans 401, 403, which constitute the auxiliary cooling fans that are provided at both the sides of the first exhaust fan 402 in such a manner as to lie close thereto. However, the projector 10 may include one main cooling fan and one auxiliary cooling fan. Alternatively, the projector 10 may include a plurality of auxiliary cooling fans for one main cooling fan or pluralities of main cooling fans and auxiliary cooling fans.

In the present embodiment, the present invention is described as being applied to the projector 10 which includes the first exhaust fan 402, which constitutes the main cooling fan, the second exhaust fans 401, 403, which constitute the auxiliary cooling fans, and the cooling target objects configured to be cooled by the first exhaust fan 402 in the interior of the casing of the projector 10. However, the present invention may be applied to other electronic units which include cooling target objects constituting heat sources and a plurality of exhaust fans.

As has been described heretofore, in the present embodiment, the projector 10, which constitutes the electronic unit, is described as including the casing, the first exhaust fan disposed close to the first side surface of the casing, the second exhaust fans disposed close to the first surface side of the casing and provided at the sides of the first exhaust fan, the first cooling target object disposed in such a manner as to correspond to the first exhaust fan, and the controller 38 configured to cause the revolution speeds of the second exhaust fans to be greater than the revolution speed of the first exhaust fan. The first exhaust fan 402 and the second exhaust fans 401, 403 are disposed close to the first side surface, whereby the cooling target objects are configured to be cooled by use of the pull-type cooling system. Thus, no local cooling fan for each cooling target object is required, whereby the overall size of the projector 10 can be reduced. Additionally, the overall driving noise generated by the first exhaust fan 402 and the second exhaust fans 401, 403 can be quietened without reducing the overall air blowing capacity by causing the revolution speeds of the second exhaust fans 401, 403 to be faster than the revolution speed of the first exhaust fan 402. Thus, it becomes possible to provide the electronic unit or the projector 10 in which the cooling target objects can be cooled while quietening the noise generated therein, and the cooling control method for cooling the cooling target objects in the electronic unit or the projector 10 while quietening the noise generated therein.

In the electronic unit in which the first exhaust fan and the second exhaust fans constitute the axial-flow fans provided parallel to the first side surface of the casing so as to blow air against the first side surface, a large volume of cooling air can be flown substantially in the same direction.

In the electronic unit in which the second cooling target objects disposed close to the second exhaust fans are disposed away from the corresponding second exhaust fans over the distances which are greater than the distance over which the first cooling target object disposed close to the first exhaust fan is disposed close to the first exhaust fan, the first cooling target object, which constitutes the main cooling target object, can be cooled effectively while quietening the noise generated as a result of driving the exhaust fans 401 to 403.

In the electronic unit in which the second exhaust fans are provided at both the sides of the first exhaust fan, the quantity of cooling air flowing through the casing can be increased.

The first exhaust fan 402 and the second exhaust fans 401, 403 are described as having substantially the same shape and substantially the same size. Additionally, the casing is described as including the exhaust port 330 in the first side surface, the air intake port 320 in the second surface side, and the plurality of first cooling target objects in series between the air intake port 320 and the first exhaust fan 402 in such a manner as to correspond to the first exhaust fan, and in the plurality of first cooling target objects, the first cooling target object (for example, the fins 191) disposed closer to the air intake port 320 than the other first cooling target objects is described as having the heat value that is smaller than that of the first cooling object (for example, the fins 520) disposed closer to the exhaust port 330 than the other first cooling target objects. As a result, air having a low temperature can be applied individually to those first cooling target objects, thereby making it possible to enhance the cooling efficiency.

In the present embodiment, in the first exhaust fan 402 and the second exhaust fans 401, 403 that have substantially the same shape and substantially the same size, the second exhaust fans 401, 403 are disposed at both the sides of the first exhaust fan 402. Further, the first cooling target objects are cooled while causing the overall driving noise generated by the first exhaust fan 402 and the second exhaust fans 401, 403 to be quietened without reducing the overall air blowing capacity by causing the revolution speeds of the second exhaust fans 401, 430 to be faster than the revolution speed of the first exhaust fan 402. However, the present invention is not limited to this configuration.

For example, the first exhaust fan 402 may be thicker than the second exhaust fans 401, 403 while the first exhaust fan 402 has substantially the same surface area as those of the second exhaust fans 401, 403. By adopting this configuration, when compared with a case where the first exhaust fan 402 has the same thickness as those of the second exhaust fans 401, 403, the distance between the first exhaust fan 402 and the fins 520, which constitute the first cooling target object, can be increased. As a result, even though the revolution speed of the first exhaust fan 402 is made to be substantially the same as those of the second exhaust fans 401, 403, the first cooling target object can be cooled with good efficiency while quietening the overall noise generated by the first exhaust fan 402 and the second exhaust fans 401, 403.

Alternatively, the surface area of the first exhaust fan 402 may be smaller than those of the second exhaust fans 401, 403 while the thickness of the first exhaust fan 402 is kept substantially the same as those of the second exhaust fans 401, 403. In this case, too, the first cooling target object can be cooled with good efficiency while quietening the overall noise by controlling the revolution speeds of the first exhaust fan 402 and the second exhaust fans 401, 403.

The embodiments are presented as examples, and hence, there is no intention to limit the scope of the present invention by the embodiments. The novel embodiments can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. An electronic unit comprising:
   a casing configured to have a horizontal configuration perpendicular relative to vertical gravitational forces acting thereon;
   a first exhaust fan disposed close to a first side surface of the casing and configured to exhaust air inside the casing;
   a first air intake port disposed in such a manner as to correspond to the first exhaust fan and formed in a second side surface opposite to the first side surface;
   a second exhaust fan disposed close to the first side surface of the casing, installed adjacent to the first exhaust fan on one side, and configured to exhaust air inside the casing;
   a second air intake port disposed in such a manner as to correspond to the second exhaust fan and formed in the second side surface opposite to the first side surface;
   a third exhaust fan disposed close to the first side surface of the casing, installed adjacent to the first exhaust fan on the other side, and configured to exhaust air inside the casing;
   a third air intake port disposed in such a manner as to correspond to the third exhaust fan and formed in the second side surface opposite to the first side surface;
   fins as a first cooling target object disposed on a path from the first air intake port to the first exhaust fan;
   a second cooling target object disposed on a path from the second air intake port to the second exhaust fan;
   a third cooling target object disposed on a path from the third air intake port to the third exhaust fan; and
   a CPU configured to control a revolution speed of at least one of the second exhaust fan and the third exhaust fan to be always faster than a revolution speed of the first exhaust fan with the casing in the horizontal configuration during operation;
   wherein the fins of the first cooling target object include fins of a first heat sink for cooling a red light source device and fins of a second heat sink for cooling an excitation light shining device and a major part of the air passing through the fins of the first heat sink and fins of the second heat sink is exhausted by way of the first exhaust fan.

2. The electronic unit according to claim 1,
   wherein the first exhaust fan and the second exhaust fan and the third exhaust fan are axial-flow fans and parallel to the first side surface so as to blow air towards the first side surface of the casing.

3. The electronic unit according to claim 1,
   wherein the first exhaust fan and the second exhaust fan and the third exhaust fan have substantially the same shape and substantially the same size.

4. The electronic unit according to claim 1,
   wherein a thickness of the first exhaust fan is thinner than a thickness of the second exhaust fan and the third exhaust fan, or a surface area of the first exhaust fan is smaller than a surface area of the second exhaust fan and the third exhaust fan.

5. The electronic unit according to claim 1,
   wherein the casing has:
   an exhaust port in the first side surface;
   an air intake port in the second side surface opposite to the first side surface; and
   a plurality of the first cooling target objects disposed in series in such a manner as to correspond to the first exhaust fan between the air intake port and the first exhaust fan, and
   wherein in the plurality of the first cooling target objects, the first cooling target object disposed closer to the air intake port has a heat value smaller than a heat value of the first cooling target object disposed closer to the exhaust port.

6. The electronic unit according to claim 1,
   wherein the fins as the first cooling target object, a heat pipe or a base plate as the second cooling target object are operatively connected to form a heat sink for a light source mounted to the base plate, the base plate and light source are arranged to be cooled by air flow in the path from the second air intake port to the second exhaust fan, and the base plate is arranged to extend perpendicular to a direction of the air flow in the path from the second air intake port to the second exhaust fan.

7. The electronic unit according to claim 1,
   wherein the fins of the first cooling target object further include fins of a third heat sink for cooling a display device.

8. The electronic unit according to claim 1,
   wherein the CPU controls the revolution speed of the second exhaust fan to be different from the revolution speed of the third exhaust fan during operation.

9. The electronic unit according to claim 8,
   wherein the CPU controls the revolution speed of the first exhaust fan, the revolution speed of the second exhaust fan, the revolution speed of the third exhaust fan to be different from each other during operation.

10. The electronic unit according to claim 1,
the second cooling target object disposed away from the second exhaust fan farther than the distance between the first exhaust fan and the first cooling target object;
the third cooling target object disposed away from the third exhaust fan farther than the distance between the first exhaust fan and the first cooling target object.

11. A projector comprising:
a casing having a horizontal configuration perpendicular relative to vertical gravitational forces acting thereon;
a light source unit;
a display device configured to generate image light from light source light emitted from the light source unit;
a projection optical system configured to project the image light emitted from the display device on to a screen;
a first exhaust fan disposed close to a first side surface of the casing and configured to exhaust air inside the casing;
a first air intake port disposed in such a manner as to correspond to the first exhaust fan and formed in a second side surface opposite to the first side surface;
a second exhaust fan disposed close to the first side surface of the casing, installed adjacent to the first exhaust fan on one side, and configured to exhaust air inside the casing;
a second air intake port disposed in such a manner as to correspond to the second exhaust fan and formed in the second side surface opposite to the first side surface;
a third exhaust fan disposed close to the first side surface of the casing, installed adjacent to the first exhaust fan on the other side, and configured to exhaust air inside the casing;
a third air intake port disposed in such a manner as to correspond to the third exhaust fan and formed in the second side surface opposite to the first side surface;
fins as a first cooling target object disposed on a path from the first air intake port to the first exhaust fan;
a second cooling target object disposed on a path from the second air intake port to the second exhaust fan;
a third cooling target object disposed on a path from the third air intake port to the third exhaust fan; and
a CPU configured not only to control the light source unit and the display device but also to control a revolution speed of at least one of the second exhaust fan and the third exhaust fan to be always higher than a revolution speed of the first exhaust fan with the casing in the horizontal configuration during operation;

wherein the fins of the first cooling target object include fins of a first heat sink for cooling a red light source device and fins of a second heat sink for cooling an excitation light shining device and a major part of the air passing through the fins of the first heat sink and fins of the second heat sink is exhausted by way of the first exhaust fan.

12. A cooling control method for an electronic unit,
the electronic unit comprising:
a casing having a horizontal configuration perpendicular relative to vertical gravitational forces acting thereon;
a first exhaust fan disposed close to a first side surface of the casing and configured to exhaust air inside the casing;
a first air intake port disposed in such a manner as to correspond to the first exhaust fan and formed in a second side surface opposite to the first side surface;
a second exhaust fan disposed close to the first side surface of the casing, installed adjacent to the first exhaust fan on one side, and configured to exhaust air inside the casing;
a second air intake port disposed in such a manner as to correspond to the second exhaust fan and formed in the second side surface opposite to the first side surface;
a third exhaust fan disposed close to the first side surface of the casing, installed adjacent to the first exhaust fan on the other side, and configured to exhaust air inside the casing;
a third air intake port disposed in such a manner as to correspond to the third exhaust fan and formed in the second side surface opposite to the first side surface;
fins as a first cooling target object disposed on a path from the first air intake port to the first exhaust fan;
a second cooling target object disposed on a path from the second air intake port to the second exhaust fan a third cooling target object disposed on a path from the third air intake port to the third exhaust fan; and
a CPU,
wherein the CPU is configured to control a revolution speed of at least one of the second exhaust fan and the third exhaust fan to be always higher than a revolution speed of the first exhaust fan with the casing in the horizontal configuration during operation, and
wherein the fins of the first cooling target object include fins of a first heat sink for cooling a red light source device and fins of a second heat sink for cooling an excitation light shining device and a major part of the air passing through the fins of the first heat sink and fins of the second heat sink is exhausted by way of the first exhaust fan.

* * * * *